United States Patent [19]
Bradfute et al.

[11] Patent Number: 5,106,688
[45] Date of Patent: Apr. 21, 1992

[54] MULTI-LAYER PACKAGING FILM AND PROCESS

[75] Inventors: John G. Bradfute, Terrazzano di Rho; Claudio Freschi, Cassiua de' Pecchi, both of Italy

[73] Assignee: W. R. Grace & Co.-Conn., Duncan, S.C.

[21] Appl. No.: 719,691

[22] Filed: Jun. 25, 1991

Related U.S. Application Data

[63] Continuation of Ser. No. 267,067, Nov. 4, 1988, abandoned.

[30] Foreign Application Priority Data

May 20, 1988 [GB] United Kingdom ............... 8811957

[51] Int. Cl.$^5$ .................................................. B32B 7/02
[52] U.S. Cl. ................................. 428/215; 428/349; 428/516; 428/34.9
[58] Field of Search .................. 428/349, 34.9, 215, 428/516

[56] References Cited

U.S. PATENT DOCUMENTS

| | | | |
|---|---|---|---|
| 4,469,742 | 9/1984 | Oberle et al. | 428/516 |
| 4,788,105 | 11/1988 | Mueller et al. | 428/483 |
| 4,857,399 | 8/1989 | Vicik | 428/516 |
| 4,857,408 | 8/1989 | Vicik | 428/516 |

FOREIGN PATENT DOCUMENTS

| | | |
|---|---|---|
| 0143510 | 11/1987 | European Pat. Off. |
| 1478576 | 7/1977 | United Kingdom |
| 1510115 | 5/1978 | United Kingdom |
| 1600250 | 10/1981 | United Kingdom |

*Primary Examiner*—Edith L. Buffalow
*Attorney, Agent, or Firm*—William D. Lee, Jr.; Jennifer L. Skord; Mark B. Quatt

[57] ABSTRACT

The packaging of high profile, high abuse products, like bone-in meat cuts and/or fresh/processed fish, often results in vacuum loss, especially when the vacuum skin packaging (VSP) process is used. To reduce this problem a highly formable, highly abuse resistant film is provided wherein at least 25% of the total thickness comprises ionomer.

14 Claims, No Drawings

MULTI-LAYER PACKAGING FILM AND PROCESS

This application is a continuation of application Ser. No. 267,067 filed on Nov. 4, 1988, now abandoned.

This invention relates to a multi-layer coextruded film suitable for packaging food products, especially by a skin packaging process, usually a vacuum skin packaging process, especially for the packaging of bone-in meat products such as steaks.

In methods of skin packaging the packaging material generally comprises a top web and a bottom web which are each sent to the packaging station. The meat or other food to be packaged is placed onto the bottom web before the packaging station. The upper web comprises a film of a thermoplastic material which is optionally preheated and then fed to the packaging station and over the product on the bottom web. There it is usually heated by contact with a heated member, for instance the inner surface of a "dome" which is then lowered over the food on the bottom web. The space between the top and bottom webs around the food is then evacuated and the top web is allowed to come into contact with the bottom web and with the food. The top web may be held against the dome for instance by vacuum pressure which is released when it is desired to allow the top web to come into contact with the bottom web. Sealing of the top and bottom webs is achieved by a combination of heat from the dome and pressure difference between the inside of the package and the outside atmosphere and can be aided by mechanical pressure and/or extra heating. The heat that is supplied in the process is merely to allow the web to form and take up the form of the food product being packaged.

It is important that the films used in the skin packaging process are substantially non-heat shrinkable since, as will be obvious from the foregoing description of the process, a conventional heat shrinkable material, which is typically shrinkable by 60 to 80% in each direction, will shrink within the "dome" and will not be suitable for packaging. In a heat shrink packaging process the shrinkable film is formed around an article to be packaged while being maintained at a temperature at which it does not shrink. After the package is sealed, optionally after being evacuated, the package is immersed in hot water or otherwise heated to shrink the film. The heat in the skin packaging process is in contrast to make the film sufficiently flexible that it conforms to the surface of the food when the vacuum is applied.

The skin packaging and developments of it process are further described in GB 1307054 and GB 1404417. In those specifications it is stated that the film used for the packaging may be a multi-layer film but there is no specific disclosure of any such films. One type of film which was used in such processes comprised a multi-layer film A-B-C-D-C-E-F, where A is a sealing (or bonding) layer comprising an ionomeric resin, B and E are respectively inner and outer bulk layers comprising low density polyethylene, C are adhesive layers for joining the barrier layer D to the bulk layers, D is a barrier layer and comprises ethylene vinyl alcohol polymer and F is an abuse layer comprising high density polyethylene. The thickness of the two bulk layers could be similar or were sometimes different, one or other of the layers being much thinner.

In EP243510 there are described improved films for skin packaging in which the bulk layers are replaced by ethylene vinyl acetate copolymers, preferably having high vinyl acetate content. The bonding layer can be ionomer. In that specification the maximum percentage of thickness which is ionomer is around 18%. Although the films with high content of vinyl acetate in the ethylene vinyl acetate layer are said to give good sealing for bone-in meat products we have found that the film still gives a high number of rejects mostly due to micro puncturing of the film, in particular in the packaging of T-bone steaks and veal steaks that are the most difficult cuts to package.

In GB1600250 there are disclosed coextruded structures comprising a sealing layer of ionomer resin and in which one of the bulk layers is also formed of ionomer resin. The film before being stretched has a thickness of about 600microns but is not used for packaging in this form but is biaxially orientated to produce a film of 10 times the area having a thickness of around 60microns. The stretched film is heat-shrinkable and is used in heat-shrink packaging processes.

In U.S. Pat. No. 4,469,742 heat-shrinkable films are described which can have a sealing layer of ionomer. The structures before stretching have a thickness of 250 to 750 microns and after orientation have a thickness of 25 to 100 microns. The shrink capacity is about 30 to 55% in each direction at 85° C. The sealing layer, which can be ionomer has a thickness of about 20% of the total laminate thickness.

According to the present invention a new coextruded multi-layer transparent thermoplastic film is substantially non-heat shrinkable at a temperature of 200° C. and comprises an inner sealing layer and an outer abuse layer and at least 25% of the thickness of the film comprises ionomer, the film being 50 to 250 microns thick.

Generally the bonding layer, otherwise known as the sealing layer or sealant, of the film comprises ionomer. The applicant has found that when ionomer comprises the bonding layer better adhesion to the food product is achieved, particularly when the product is meat or other protein-containing product. Better adhesion prevents movement of the product relative to the film and this in turn minimises damage to the film by the product particularly when the product is a bone-in meat cut which may often contain sharp splinters of bone which cause punctures in the film.

Preferably the abuse layer comprises a polymer which has a higher melting point than the glass transition temperature of the components of each of the other layers of the film. The abuse layer is the side of the film which comes into contact with the heated frame or dome of a skin packaging apparatus. The temperature to which the film must be heated is above the glass transition temperature of each of the components in order that the film is rendered flexible so as to conform to the food product during packaging. It is preferred for the abuse layer to have a melting point higher than the temperature to which the film must be heated in order to minimise the transfer of softened or melted material from that layer onto the heated part of the apparatus during the processing operation. A suitable polymer for the abuse layer is high density polyethylene (HDPE). Ionomer can also be used.

Generally the laminate comprises a barrier layer. The barrier layer prevents the egress and, more importantly, the ingress of gases, such as oxygen which could otherwise damage the content of the package by allowing oxidation. This barrier layer can comprise a vinylidene chloride homopolymer or copolymer although it is preferred for the barrier layer to comprise an ethylene-vinyl alcohol polymer (EVOH), especially where the film is irradiated during production, as preferred. The EVOH polymer can be one of those conventionally used as a barrier layer in coextruded films and comprises hydrolysed ethylene vinyl acetate copolymer, preferably hydrolysed to a degree of at least 50%, more preferably at least 99%. The mole% of vinyl acetate is generally at least 25%, preferably at least 29%, higher proportions of vinyl acetate and higher degrees of hydrolysis giving improved barrier properties. When the barrier layer is EVOH its glass transition temperature is usually the highest of the film components and thus determines the minimum temperature to which the film should be heated to render it flexible during the skin packaging operation.

The film can comprise additional layers, for instance bulk layers positioned between the sealing layer and the outer abuse layer for instance one or more layers on one or both sides of any barrier layer. Such bulk layers may comprise any transparent thermoplastic material conventionally used in extruded films. Thus the bulk layer or layers could comprise polyamide such as nylon, polyester or polystyrene, but is usually an ethylene polymer or copolymer, for instance a block or random copolymer with propylene or a copolymer with vinyl acetate, preferably one with a relatively high vinyl acetate content for instance at least 9 mole %, up to about 27 mole % or higher, preferably in the range 12 to 24%. The most preferred bulk layer comprises an ionomer resin. It is especially preferred that the inner bulk layer, that is any bulk layer which is generally close to the sealing layer side of the film for instance on the inner side of any barrier layer, comprises ionomer. It is more preferable that, in addition to the inner bulk layer any outer bulk layer is also formed of ionomer. Sometimes it may be advantageous for a bulk layer comprising ionomer to comprise also a layer of another polymer, usually ethylene-vinyl acetate polymer.

The ionomer, or ionomeric resin, which is used in the present invention is for instance a copolymer of ethylene with a copolymerisable ethylenically unsaturated acidic monomer, usually an ethylenically unsaturated carboxylic acid, which may be di- or more basic but is generally mono-basic, for instance acrylic or methacrylic acid. The term ionomer in this specification covers such polymers in their free acid form as well as their ionised form. The ionomer is preferably in its ionised rather than its free acid form, the neutralising cation being any suitable metal ion for instance, an alkali metal ion, zinc ion or other multivalent metal ion. Suitable ionomers are sold under the trade mark Surlyn marketed by DuPont. Preferably the ionomer, especially one for a bulk layer has a relatively low melt index. An ionomer layer may comprise a mixture of different ionomer types and/or layers comprising different ionomer types may be provided adjacent to one another.

The film may also comprise adhesive or tie layers to aid adhesion of adjacent components. Such adhesive layers are of particular importance for adhering barrier layers to adjacent layers. The material used for the adhesive layer can be any of those known to be useful in adhering adjacent layers of coextruded films. Suitable adhesive layers comprise for instance chemically modified ethylene polymers, for instance copolymers of ethylene with esters of ethylenically unsaturated carboxylic acids, such as alkyl (meth) acrylates, graft copolymers of (meth) acrylic acid, maleic acid or anhydride or vinyl chloride onto ethylene vinylacetate copolymers, graft copolymers of fused ring carboxylic anhydrides onto polyethylene, saponified ethylene vinyl acetate, resin mixtures of these and mixtures with polyethylene or copolymers of ethylene and alpha olefin. Suitable adhesive materials are sold under the trade name Plexar and are further described in U.S. Pat. Nos. 4,087,587 and 4,087,588.

The film of the invention should be substantially non heat shrinkable at a temperature of 200° C. and preferably should be substantially non-heat-shrinkable at a temperature of 85° C. or 100° C. or more, for instance 130° C. By substantially non-heat shrinkable we mean that when the film is heated to the specified temperature it shrinks by an amount of less than 25% preferably less than 20% or 10% of its dimension in each direction. The film can also be described as substantially non-oriented or as substantially dimensionally stable at the above specified temperatures. The temperature of 200° C. is chosen for the assessment of heat shrinkability as that is the temperature of which the film is heated in the conventional skin packaging apparatus to render the film flexible during the packaging operation, although sometimes the film can be treated to even higher temperatures, for instance around 250° C.

The film is 50–250 microns thick. Thinner films are generally insufficiently resistant to damage during packaging of bone-in meat cuts. It is unnecessary and expensive to use films thicker than 250 microns and in some instances such films can have worse abuse resistant properties than thinner films. Usually the film is in the range 75 to 200 microns thick more preferably 100 to 130 or 150 microns thick.

The abuse layer may comprise about 3–25% of the total thickness of the film for instance being 5 to 25, usually 10 to 15 microns thick. The bonding layer may comprise to 75%, more preferably about 3 to 25% or 3 to 10% of the total thickness for instance being 5 to 20, preferably 7 to 15 or 8 to 12 microns thick. Any barrier layer usually for instance comprises up to 40%, usually up to about 20% of the total thickness, usually being up to 20 microns thick, preferably 5 to 15 or 7–12 microns thick. Any adhesive layers are generally at least 2 microns and up to 10 microns thick, best adhesion being achieved with about 3 to 10 microns thickness. Bulk layers generally comprise up to 80 or 90% of the total thickness of the film, preferably at least 20 or more preferably at least 50% of the total thickness of the film. The bulk material is preferably provided on both sides of any barrier layer, the ratio of inner bulk layer to outer bulk layer thicknesses being in the range 10:1 to 1:10, preferably in the range 3:1 to 1:3, for instance about 1:1. The total bulk layer thickness is suitably in the range 20 to 200 microns, for instance 50 to 150 microns.

Usually the film comprises layer or layers of ionomer resin with a total thickness of at least 30 microns preferably at least 50 to 75 microns. The thickness of the ionomer layer or layers amounts to at least 25%, usually at least 30 or 50% of the total film thickness. As stated above, it is found to be of particular advantage if the inner part of the film, that is which will be towards the product to be packaged, comprises a high proportion of ionomer, for instance at least 50% of the thickness of the inner half of the film comprising ionomer. Advantageously the film comprises other components as described above, and the layer or layers of ionomer preferably comprise a maximum of 90 or 80% of the total thickness.

The film is made by a conventional coextrusion process, using a suitable die, and is usually extruded as a tube from a die having sufficient flow passages for all of the components. Preferably the coextruded laminate film is irradiated for instance with ionising radiation of about 5 to 20 MRad, preferably 8 to 16 MRad. The irradiation results in cross-linking of the components of the films, this resulting in improved strength and improve formability, as well as better adhesion between layers. Furthermore it may also improve the adhesive properties of the bonding or sealing layer to the packaged product by increasing the adhesiveness to protein. As explained above, increasing adhesion to the package product may reduce damage of the film by the product during the packaging operation as well as during transport and storage.

According to a further aspect of the invention a new process for skin packaging an article comprises placing the article on a support backing, heating a top thermoplastic film web to above the glass transition temperature of the components of the film, applying the heated film over the article on the support packing, and applying a differential pressure across the film to draw the film into sealing engagement with the support backing, and the process is characterised in that the film comprises one or more layers of ionomeric resin the thickness of said ionomeric resin layer or layers being at least 25% of the total film thickness.

The process is particularly suitable for packaging bone-in meat products, particularly beef or veal steaks, even relatively thick steaks.

The film is preferably a new film as described above, the film being arranged so that the bonding (sealing) layer is placed in contact with the article and the abuse layer is outermost. The process is usually of the type described in GB 1404417 or GB1307054, usually one where the film is at least partially heated by contact with a heated cavity. The abuse layer which contacts the heated surface is preferably one having a melting point higher than the temperature of the surface, to prevent softening or melting material being transferred to the surface of the apparatus. The support backing used in the process can comprise the same type of film and may be flat or shaped, for instance, tray-shaped. The backing can be heated during the packaging process so that it will form a skin, conforming to the lower surfaces of the article. Usually however the backing is not heated and so substantially retains its shape during the packaging process. It is usually preformed, for instance by thermoforming a thermoplastic film material. Usually the backing is also transparent, although it can be opaque or coloured.

The following examples illustrate the invention:

EXAMPLES

Films were made by coextruding the materials listed in Table 1 to give a multi-layer film wherein the layers have the thicknesses shown in Table 1. After extrusion the films are irradiated at a level of 12 MRad. Examples 1, 5, 6, 7 and 9 are comparative.

The films are used in formability and packaging tests. The formability tests are carried out by using the film as the top web in a Cryovac VS44 machine with conventional thermoformed trays as the bottom web, to pack a range of standard shaped hard plastic blocks (Cryovac is a registered trade mark). These blocks were 15 each of two sizes of plain rectangular block, of a circular cylindrical block (placed flat on the tray), and of a rectangular block having a number of circular cavities of differing diameter formed in its upper surface. The latter type of block is further described in EP243610. The properties that were evaluated were the tendency of the film for bridging formation from the product to the tray, the tendency for webbing formation (webbing is usually formed at corners of the blocks and comprises upright "webs" of folded film), the formation of pleats or longitudinal wrinkles on the upper surface of the plain packaged block and, for the block with cavities, the largest of the cavities which does not have a ruptured film. Each property is scored, higher values indicating better properties, and the values are added together.

Packaging performance tests are also carried out. For these veal steaks, generally found to be the cuts most likely to lead to rejected packages, were used. They were prepared by the following procedure:

a) storage of the loin for the time necessary to achieve a product temperature of −2° C.;
b) partial sawing of the vertebras;
c) automatic slicing with machine, set for a 15mm-high steak;
d) two steaks were loaded on each tray with the bones laid-down close to two opposite corners of the tray (i.e. in the most critical position). A 2-tray across tooling, with a tray depth of 10mm, was utilized;
e) 100 packages were produced for each formulation and checked after 1-day storage at refrigerated conditions.

The results are reported in Table 1. In the table the following are used:—

EVA—ethylene-vinyl acetate polymer—figure in brackets is mole % of vinyl acetate.
LDPE—low density polyethylene.
HDPE—high density polyethylene.
EVOH—ethylene vinyl alcohol.

Comparison of Example 1 with examples 2–4 shows that replacement of all or almost all of the inner and outer EVA bulk layers by ionomer gives great improvement in the abuse resistance without decreasing the formability too much.

Comparison of examples 5, 6 and 7 shows that ionomer is far superior to LDPE and to the free acid form of the ionomer as sealant or bonding layer, when all other components of the film remain the same.

Comparison of examples 7 and 8 shows that replacement of the outer bulk layer by ionomer retains the formability properties and abuse resistance. Comparison of example 8 with 2 and 3 shows that the use of an inner ionomer bulk layer gives a major improvement in abuse resistance. Likewise comparison of examples 7, 8, 9 and 11 shows that the incorporation of an inner bulk layer has a more significant effect on abuse resistance than the incorporation of an outer bulk layer.

Comparison of Examples 10 and 11 shows that decreasing the thickness of the film reduces only to a small extent the formability of the film but, surprisingly, improves the abuse resistance.

Comparison of Examples 9 and 7 shows that the thickness of the barrier layer has little effect on the abuse resistance of the films.

TABLE

| Example | Bonding | Inner Bulk | Adhesive | Barrier | Adhesive | Outer Bulk | Abuse | Thickness Total (μm) | Formability Score (max 15) | Packaging Test rejects % |
|---|---|---|---|---|---|---|---|---|---|---|
| 1 | Ionomer | EVA (18) | EVA (9) | Modified EVA | EVOH | Modified EVA | EVA (9) | HDPE | 150 | 8 | 25 |
| 2 | Ionomer | EVA (18) | Ionomer | Modified EVA | EVOH | Modified EVA | Ionomer | HDPE | 150 | 12 | 3 |
| 3 | Ionomer | EVA (18) | Ionomer | Modified EVA | EVOH | Modified EVA | Ionomer | HDPE | 150 | 11 | 3 |
| 4 | Ionomer | Ionomer | Ionomer | Modified EVA | EVOH | Modified EVA | Ionomer | Ionomer | 150 | 9 | 5 |
| 5 | LDPE | EVA (18) | EVA (18) | Modified EVA | EVOH | Modified EVA | EVA (18) | HDPE | 150 | 13 | 40 |
| 6 | Ionomer (free acid) | EVA (18) | EVA (18) | Modified EVA | EVOH | Modified EVA | EVA (18) | HDPE | 150 | 13 | 23 |
| 7 | Ionomer | EVA (18) | EVA (18) | Modified EVA | EVOH | Modified EVA | EVA (18) | HDPE | 150 | 14 | 11 |
| 8 | Ionomer | EVA (18) | EVA (18) | Modified EVA | EVOH | Modified EVA | Ionomer | HDPE | 150 | 13 | 17 |
| 9 | Ionomer | EVA (18) | EVA (18) | Modified EVA | EVOH 15 | Modified EVA | EVA (18) | HDPE | 158 | 8 | 11 |
| 10 | Ionomer 11 | Ionomer 36 | EVA (18) 4 | Modified EVA | EVOH 6 | Modified EVA | EVA (18) 52 | HDPE 15 | 130 | 7 | 6 |
| 11 | Ionomer | Ionomer 41 | EVA (18) 5 | Modified EVA | EVOH | Modified EVA | EVA (18) | HDPE | 150 | 9 | 11 |
| Thickness* of layer (μm) | 13 | 8 | 38 | 3 | 7 | 3 | 60 | 18 | 150 | | |

*Unless otherwise specified in figures under component

We claim:

1. A thermoplastic film which when heated to a temperature of 200° C. shrinks by an amount of less than 25% of its dimension in each direction comprises an inner sealing layer and an outer abuse layer and at least 50% of the thickness of the film comprises ionomer, the film being 50 to 250 microns thick.

2. A film according to claim 1 in which at least 50% of the thickness of the inner half of the film comprises ionomer.

3. A film according to claim 1 in which the bonding layer comprises ionomer.

4. A film according to claim 1 comprising a barrier layer.

5. A film according to claim 4 which comprises adhesive layers on one or each side of the barrier layer, between the barrier layer and adjacent layer.

6. A film according to claim 1 in which the abuse layer comprises high density polyethylene.

7. A film according to any preceding claim which additionally comprises at least one layer of ethylene vinyl acetate copolymer.

8. A film according to claim 1 which has been irradiated.

9. A film according to claim 2 in which at least 60% of the thickness of the inner half of the film comprises ionomer.

10. A film according to claim 3 in which the bonding layer comprises an ionomer in metal salt form.

11. A film according to claim 4 in which the barrier layer comprises a copolymer of ethylene and vinyl alcohol.

12. A film according to claim 5 in which the adhesive layer comprises a modified ethylene vinyl acetate copolymer.

13. A film according to claim 1 in which the abuse layer comprises ionomer.

14. A film according to claim 7 in which the ethylene vinyl acetate copolymer has a mole percent of vinyl acetate units of 9 to 27%.

* * * * *